United States Patent
Kwon et al.

(10) Patent No.: US 11,831,874 B2
(45) Date of Patent: *Nov. 28, 2023

(54) SEMI-GLOBAL MATCHING (SGM) COST COMPRESSION

(71) Applicant: Texas Instruments Incorporated, Dallas, TX (US)

(72) Inventors: Do-Kyoung Kwon, Allen, TX (US); Jing-Fei Ren, Plano, TX (US); Darnell Moore, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,945

(22) Filed: Dec. 1, 2021

(65) Prior Publication Data

US 2022/0094933 A1   Mar. 24, 2022

Related U.S. Application Data

(63) Continuation of application No. 16/794,551, filed on Feb. 19, 2020, now Pat. No. 11,218,699, which is a (Continued)

(51) Int. Cl.
*H04N 19/124* (2014.01)
*H04N 13/161* (2018.01)
(Continued)

(52) U.S. Cl.
CPC ........... *H04N 19/124* (2014.11); *G06T 7/593* (2017.01); *H04N 13/161* (2018.05); (Continued)

(58) Field of Classification Search
CPC .. H04N 19/124; H04N 19/137; H04N 19/182; H04N 13/161; H04N 2013/0081; G06T 7/593

See application file for complete search history.

(56) References Cited

U.S. PATENT DOCUMENTS

| | | | | |
|---|---|---|---|---|
| 6,061,477 A | * | 5/2000 | Lohmeyer | G06T 3/4084 382/293 |
| 6,256,347 B1 | * | 7/2001 | Yu | H04N 19/98 375/E7.266 |

(Continued)

OTHER PUBLICATIONS

Dimitris Agrafiotis; Chapter 9—Video Error Concealment; Academic Press Library in Signal Processing, Elsevier, vol. 5, 2014, p. 301; avaialble at https://www.sciencedirect.com/science/article/pii/B9780124201491000090 (Year: 2014).*

(Continued)

*Primary Examiner* — Jeremiah C Hallenbeck-Huber
(74) *Attorney, Agent, or Firm* — Carl G. Peterson; Frank D. Cimino

(57) ABSTRACT

This disclosure describes techniques for performing semi-global matching (SGM) path cost compression. In some examples, the techniques may perform disparity-dependent sub-sampling of a set of SGM path costs where the sub-sampling ratio is determined based on a candidate disparity level. The sub-sampled SGM path costs may be stored in a memory. When retrieved from memory, the sub-sampled SGM path costs may be interpolated to reconstruct the other path costs not stored in the memory. The reconstructed path costs may be used for further SGM processing. In further examples, the techniques may perform disparity-dependent quantization on the SGM path costs or the sub-sampled SGM path costs, and store the quantized SGM path costs in memory. The techniques of this disclosure may reduce bandwidth as well as reduce the memory footprint needed to implement an SGM algorithm.

20 Claims, 4 Drawing Sheets

Related U.S. Application Data continuation of application No. 15/012,829, filed on Feb. 1, 2016, now Pat. No. 10,616,578.

(60) Provisional application No. 62/109,998, filed on Jan. 30, 2015.

(51) Int. Cl.
*H04N 19/137* (2014.01)
*H04N 19/182* (2014.01)
*G06T 7/593* (2017.01)
*H04N 13/00* (2018.01)

(52) U.S. Cl.
CPC ......... *H04N 19/137* (2014.11); *H04N 19/182* (2014.11); *H04N 2013/0081* (2013.01)

(56) References Cited

U.S. PATENT DOCUMENTS

| | | | | |
|---|---|---|---|---|
| 2003/0123539 A1* | 7/2003 | Kim | ............... | H04N 19/159 375/E7.157 |
| 2004/0146108 A1* | 7/2004 | Hsia | ............... | H04N 19/15 348/700 |
| 2007/0255480 A1* | 11/2007 | Southall | ............... | B60T 7/22 701/96 |
| 2010/0020878 A1* | 1/2010 | Liang | ............... | H04N 19/40 375/240.16 |
| 2010/0271511 A1* | 10/2010 | Ma | ............... | H04N 13/25 382/254 |
| 2012/0155550 A1* | 6/2012 | Wu | ............... | H04N 19/59 382/300 |
| 2013/0083994 A1* | 4/2013 | Ren | ............... | G06T 7/97 382/154 |
| 2013/0128975 A1* | 5/2013 | Gupte | ............... | H04N 19/433 375/E7.104 |
| 2014/0241587 A1* | 8/2014 | Jung | ............... | G06V 20/647 382/107 |
| 2015/0319419 A1* | 11/2015 | Akin | ............... | G06T 7/97 348/49 |
| 2015/0332467 A1* | 11/2015 | Lange | ............... | H04N 13/271 348/46 |
| 2016/0165216 A1* | 6/2016 | Wu | ............... | H04N 13/15 348/223.1 |
| 2016/0301912 A1* | 10/2016 | Saitoh | ............... | G06T 7/593 |

OTHER PUBLICATIONS

Ren, et al. "Hybrid Tiling Strategy For Semi-Global Matching Stereo Hardware Acceleration," U.S. Appl. No. 15/073,078, filed Mar. 17, 2016, 31 pages.

Gehrig, et al., "Real-Time Semi-Global Matching on the CPU," IEEE Computer Society Conference on Computer Vision and Pattern Recognition, http://ieee.org/stamp/stamp.jsp?tp=&arnumber=5543779&isnumber=5443135, San Francisco, CA, 2010, pp. 82-92.

Hirschmuller, H., et al., "Accurate and Efficient Stereo Processing by Semi-Global Matching and Mutual Information," vol. 2, , 2005 IEEE Computer Society Conference on Computer Vision and Pattern Recognition (CVPR 05), http://ieeexplore.ieee.org/stamp/stamp.jsp?tp=&arnumber=1467526&isnumber=31473, 2005, pp. 807-814.

Spangenberg, R., et al., "Large Scale Semi-Global Matching on the CPU," IEEE Intelligent Vehicles Symposium Proceedings, http://ieeexplore.ieee.org/stamp/stamp.jsp?tp=&arnumber=6856419&isnumber=6856370, Dearborn, MI, 2014, pp. 195-201.

* cited by examiner

SEMI-GLOBAL MATCHING (SGM) COST COMPRESSION

This application is a continuation of U.S. patent application Ser. No. 16/794,551 filed Feb. 19, 2020, which is a continuation of U.S. patent application Ser. No. 15/012,829, filed Feb. 1, 2016, now U.S. Pat. No. 10,616,578, which also claims benefit of U.S. provisional patent application Ser. No. 62/109,998, filed Jan. 30, 2015, which applications are herein incorporated by reference in their entireties.

TECHNICAL FIELD

This disclosure is related to stereo matching techniques, and more particularly to techniques for implementing semi-global matching.

BACKGROUND

Semi-Global Matching (SGM) may achieve robust stereo correspondence results. However, the high on-chip memory usage of SGM to store aggregated SGM path costs in line buffer increases area. As a result, it is often impractical to implement in embedded platforms for high resolution images.

SUMMARY

A method includes, for each of a plurality of candidate disparity levels, calculating, with processing circuitry, a plurality of costs for a plurality of pixels in a scan region based on the respective candidate disparity level; calculating, with the processing circuitry, a plurality of semi-global matching (SGM) path costs for a subset of the pixels that form a path in the scan region based on the costs and the respective candidate disparity level; determining, with the processing circuitry, a sub-sampling ratio based on the respective candidate disparity level; sub-sampling, with the processing circuitry, the SGM path costs based on the determined sub-sampling ratio; and storing, with the processing circuitry, the sub-sampled SGM path costs for the respective candidate disparity level in a memory.

An apparatus includes processing circuitry configured to, for each of a plurality of candidate disparity levels calculate a plurality of costs for a plurality of pixels in a scan region based on the respective candidate disparity level; calculate a plurality of semi-global matching (SGM) path costs for a subset of the pixels that form a path in the scan region based on the costs and the respective candidate disparity level; determine a sub-sampling ratio based on the respective candidate disparity level; sub-sample the SGM path costs based on the determined sub-sampling ratio; and store the sub-sampled SGM path costs for the respective candidate disparity level in a memory.

A non-transitory computer-readable medium comprising instructions that, when executed by one or more processors, cause the processors to calculate a plurality of costs for a plurality of pixels in a scan region based on the respective candidate disparity level; calculate a plurality of semi-global matching (SGM) path costs for a subset of the pixels that form a path in the scan region based on the costs and the respective candidate disparity level; determine a sub-sampling ratio based on the respective candidate disparity level; sub-sample the SGM path costs based on the determined sub-sampling ratio; and store the sub-sampled SGM path costs for the respective candidate disparity level in a memory.

DETAILED DESCRIPTION

SGM achieves accurate distance measure for ADAS application. However, DDR memory bandwidth and high on-chip memory usages make it impractical to implement in embedded platform for high-resolution images. To tackle the DDR memory bandwidth issue in SGM, the parallelogram block raster scan processing and tile-based processing were proposed for forward pass and backward pass. However, these solutions cause memory issues. Accordingly, there is a need for a solution that would resolve the high on-chip memory issue in SGM.

Figure 1:
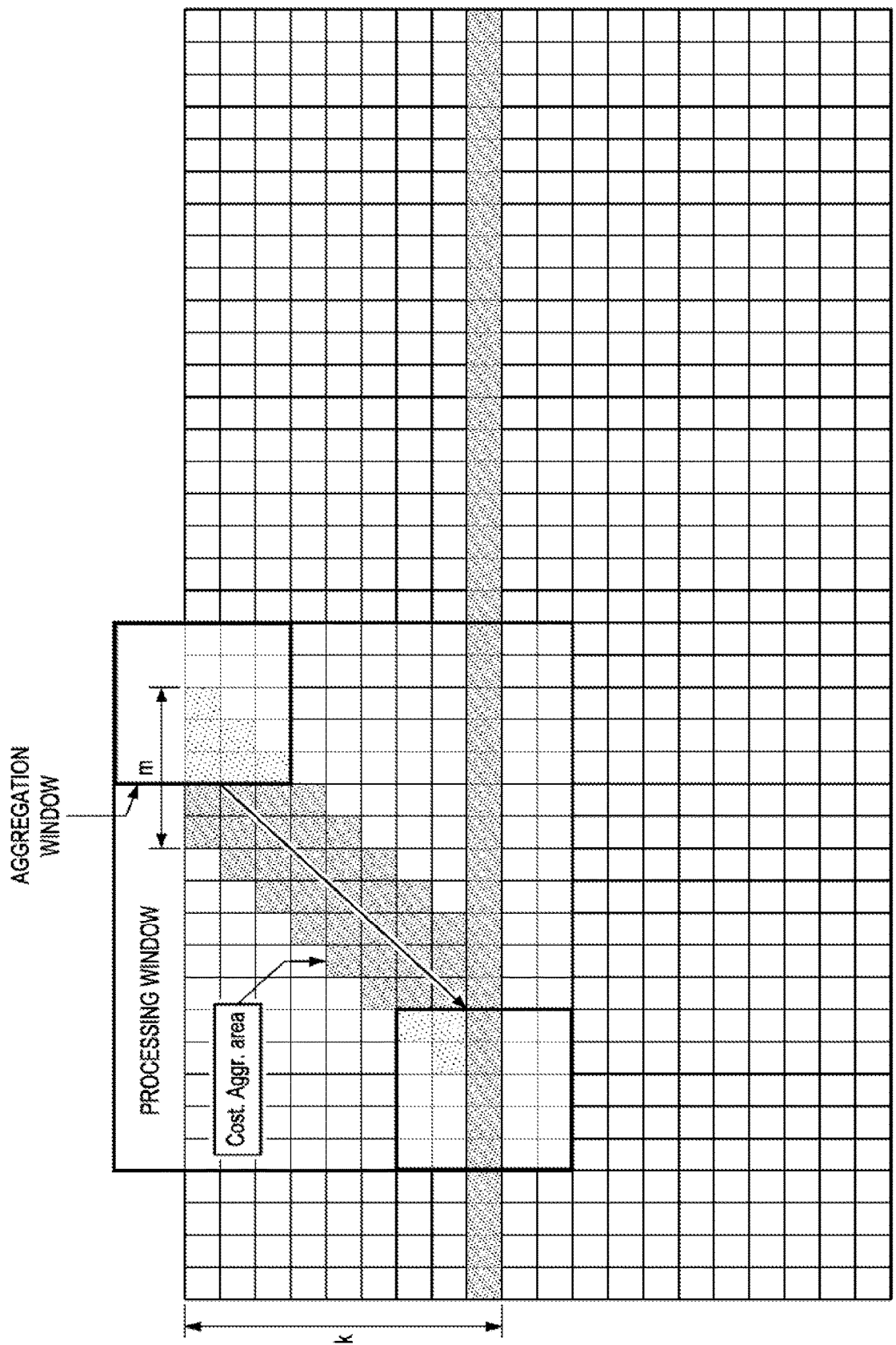
FIG. 1 is an embodiment of a parallelogram block raster scan processing for forward SGM.

FIG. 1 is an embodiment of a parallelogram block raster scan processing for forward SGM. In FIG. 1, k is the height of block. The forward SGM aggregation is done by aggregating SGM path costs, from neighboring left, top-left, top and top-right pixels. Therefore, the aggregated SGM path costs of every pixel in every k-th row are usually stored in a line buffer, for accessibility when processing the next row. The aggregated path costs for each pixel are stored, $L_r(p, d)$, where $d=d_{min}-d_{max}-1$, $p=↘, ↓$, and ↙. For 2K width, $d_{min}=0$ and $d_{max}=196$. Thus, on-chip memory as large as 3 dir*2K*196*1.5 bytes>1720 Kbytes is needed. However, improved SGM path cost compression methods are proposed to reduce the on-chip memory size for SGM. For example, 1) disparity-dependent sub-sampling and interpolation may be used and/or 2) disparity dependent quantization and inverse quantization.

Figure 2:
FIG. 2 is an embodiment of a disparity-dependent Semi-Global Matching (SGM) path cost sub-sampling for each pixel.

FIG. 2 is an embodiment of a disparity-dependent Semi-Global Matching (SGM) path cost sub-sampling for each pixel. As shown in FIG. 2, different sub-sampling ratios are applied depending on the disparity range to exploit unequal importance of disparity errors. In this example, SGM path costs between $d_{min}$ and $d_{s1}$ are not sub-sampled, those between $d_{s1}$ and $d_{s2}$ are sub-sampled by 2, and those between $d_{s2}$ and $d_{max}-1$ are sub-sampled by 4. Note that it is also possible to divide disparity range more finely (e.g. >3 sub-sampling ratios) and coarsely (e.g. just 1 sub-sampling ratio, i.e. disparity independent).

Figure 3:
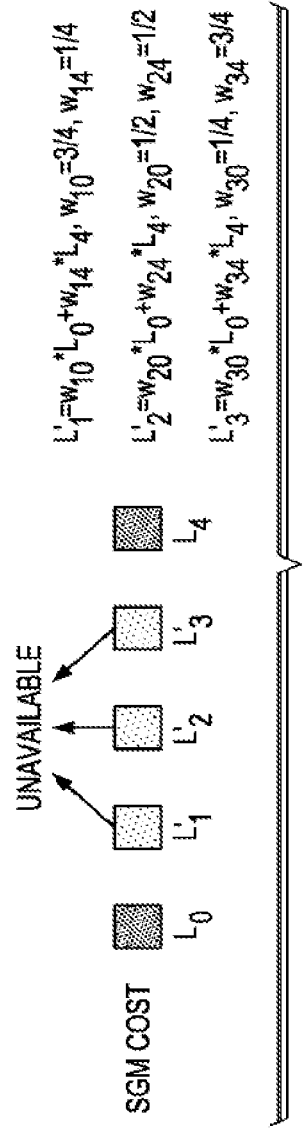
FIG. 3 is an embodiment of a bi-linear interpolation of unavailable SGM path costs.
Figure 4:
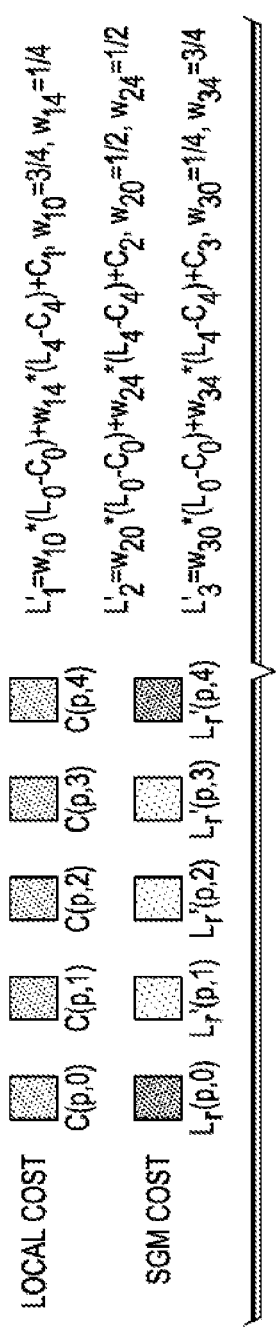
FIG. 4 is an embodiment of a local cost guided bi-linear interpolation of unavailable SGM path costs.

FIG. 3 is an embodiment of a bi-linear interpolation of unavailable SGM path costs. More specifically, FIG. 3 relates to restoring data for future processing. As shown in FIG. 3, when reading back from the memory, unavailable SGM path costs after sub-sampling are interpolated before use using bi-linear interpolation. To improve the accuracy of interpolation, local cost guided bi-linear interpolation is also proposed as shown in FIG. 4. FIG. 4 is an embodiment of a local cost guided bi-linear interpolation of unavailable SGM path costs. Local cost (i.e. local block-matching cost) and SGM path cost, which is derived partially from local cost, are closely related. For this reason, SGM path cost interpolation is guided by local cost. Note that other interpolation methods other than bi-linear interpolation, e.g. such as cubic interpolation, may be employed. They can be also modified so that it can be guided by local cost as well.

Figure 5:
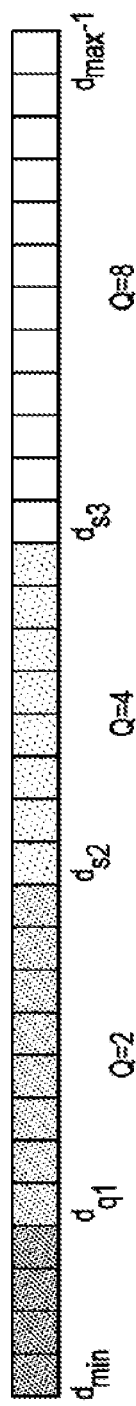
FIG. 5 is an embodiment of a disparity-dependent SGM path cost quantization for each pixel.

For higher compression ratio, the disparity-dependent SGM path cost quantization is proposed as shown in FIG. 5. FIG. 5 is an embodiment of a disparity-dependent SGM path cost quantization for each pixel. For guaranteed compression ratio without rate control, fixed quantization is employed. However, quantization step is dependent on disparity range. In the following example, SGM path costs between $d_{min}$ and $d_{q1}$ are not quantized, those between $d_{q1}$ and $d_{q2}$ are quantized by Q step=2, those between $d_{q2}$ and $d_{q3}$ are quantized by Q step=4, and those between $d_{q3}$ and $d_{max}-1$ are quantized by Q step=8. Note that it is also possible to divide disparity range more finely (e.g. >4 Q steps) and coarsely (e.g. just 1 Q step, i.e. disparity independent). Other quantization steps could be used as well. Quantization can be simply done by right bit shift. For instance, Q=2, 4 and 8 can be done by >>1, >>2 and >>3, respectively. Inverse quantization is done by left bit shift.

Figure 6:
FIG. 6 is an embodiment of a system for performing SGM path cost compression according to this disclosure.

FIG. 6 is an embodiment of an overall flow according to this disclosure. As shown in FIG. 6, after processing the pixels in every k-th row, all aggregated SGM path costs are compressed by sub-sampling followed by quantization. Afterwards, it is stored in on-chip memory. Before processing the pixels in every (k+1)-th row, these aggregated SGM path costs are fetched and decompressed by inverse quantization followed by interpolation.

Figure 7:
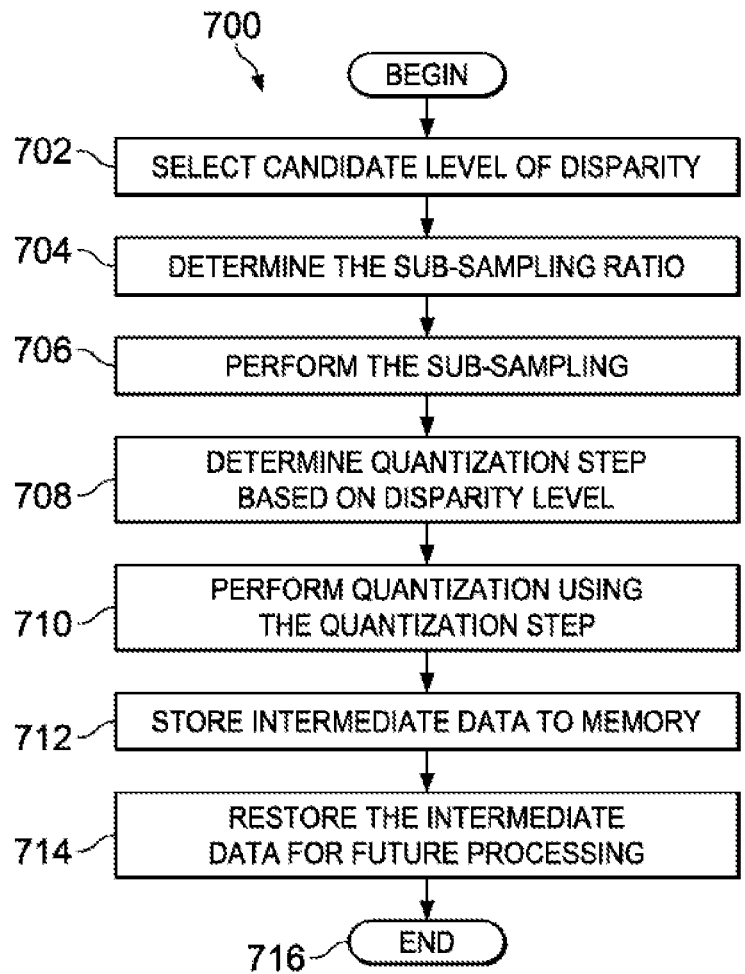
FIG. 7 is an embodiment of a method 700 for SGM path cost compression.

FIG. 7 is an embodiment of a process 700 for SGM path cost compression. The process starts at step 702 and proceeds to step 704. At step 704, the method selects a candidate level of disparity. At step 704, the method 700 determined the sub-sampling ratio. The ratio range is lower for lower disparity and higher for higher disparity. At step 706, the method 700 applies the subsampling based on the disparity and ratio. At step 708, the method 700 determines the quantization step based on disparity level. At step 710, the method 700 performs quantization using the quantization step determined. At step 712, the method 700 stores the intermediate date to memory. At step 714, for future data processing, the intermediate data is restored i.e. using inverse quantization and/or bi-linear interpolation. At step 716, the process ends. The intermediate data may include SGM path costs, and the future processing may include calculating SGM path costs for a subsequent row, column, or diagonal based on the intermediate data. In further examples, the future processing may include summing the SGM path costs to produce aggregate SGM costs, and determining a disparity level (e.g., closeness to lens (further from camera=less disparity)) based on the aggregate SGM costs.

Figure 8:
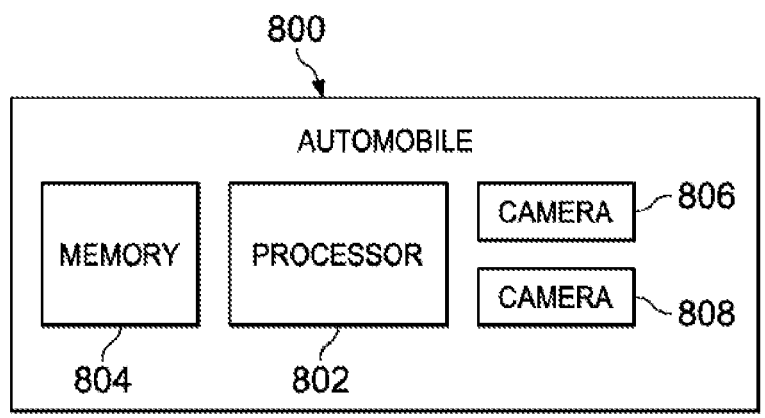
FIG. 8 is a block diagram showing an example automobile system 800 that may implement the SGM cost compression techniques of this disclosure.

FIG. 8 is a block diagram showing an example automobile system 800 that may implement the SGM cost compression techniques of this disclosure. The automobile 800 includes a processor 802, a memory 804, and cameras 806, 808. Cameras 806, 808 are configured to capture a pair of images (i.e., stereo images). Processor 802 may process the stereo images, and determine a disparity level associated with the images. To determine the disparity level, processor 802 may perform one or more of the semi-global matching (SGM) techniques described in this disclosure. Processor 802 may store compressed, sub-sampled, and/or quantized SGM path costs in memory 804, and retrieved the compressed, sub-sampled, and/or quantized SGM path costs from memory 804 for further processing.

Processor 802 may include one or more microprocessors, one or more microcontrollers, one or more digital signal processors (DSPs), one or more integrated circuits (ICs), or any other processing circuitry. Memory 804 may, in some cases, be an example of a non-transitory computer-readable medium comprising instructions that cause processor 802 to perform one or more of the SGM techniques described in this disclosure.

In some examples, processor 802 may be configured to, for each of a plurality of candidate disparity levels: calculate a plurality of costs (e.g., local pixel costs) for a plurality of pixels in a scan region based on the respective candidate disparity level; calculate a plurality of semi-global matching (SGM) path costs for a subset of the pixels that form a path in the scan region based on the costs and the respective candidate disparity level; determine a sub-sampling ratio based on the respective candidate disparity level; sub-sample the SGM path costs based on the determined sub-sampling ratio; and store the sub-sampled SGM path costs for the respective candidate disparity level in a memory.

In further examples, processor 802 may be further configured to, for each of the plurality of paths calculate a plurality of semi-global matching (SGM) path costs for pixels in the respective path of the scan region based on the costs and the respective candidate disparity level; sub-sample the SGM path costs for pixels in the respective path based on the determined sub-sampling ratio; and store the sub-sampled SGM path costs for pixels in the respective path in the memory.

In some examples, a sub-sampling ratio for a set of lower candidate disparity levels is less than a sub-sampling ratio for a set of higher candidate disparity levels. In such examples, a sub-sampling ratio of N is indicative of sub-sampling every Nth SGM path cost in a path. In further examples, for a lowest set of disparity levels, processor 802 may perform no sub-sampling (e.g., sub-sampling at a sub-sampling ratio of 1), and for higher disparity levels, processor may perform sub-sampling (e.g., sub-sampling at a sub-sampling ratio that is greater than 1).

In further examples, processor 802 may retrieve the sub-sampled SGM path costs from the memory; interpolate the retrieved sub-sampled SGM path costs to generate a plurality of reconstructed SGM path costs for the respective candidate disparity level; calculate aggregate SGM costs for the respective candidate disparity level based on the reconstructed SGM path costs; and determine a disparity level for a set of stereo images based on the aggregate SGM cost.

In some examples, processor 802 may, for each of the pixels, sum the SGM path costs that correspond to the respective pixel for each of a plurality of paths. In further examples, processor 802 may interpolate the retrieved sub-sampled SGM path costs using bi-linear interpolation based on a set of weights.

In some examples, processor 802 may interpolate the retrieved sub-sampled SGM path costs based on the costs for the pixels and a set of weights. In such examples, processor 802 may, for each of a plurality of pixels, subtract a cost associated with the respective pixel from a retrieved sub-sampled SGM path cost associated with the respective pixel.

In additional examples, processor 802 may, for each of the candidate disparity levels determine a quantization step size based on the respective candidate disparity level; and quantize the sub-sampled SGM path costs based on the determined quantization step size. The processing circuitry is further configured to store the quantized sub-sampled SGM path costs for the respective candidate disparity level in the memory.

In further examples, processor 802 may for each of the candidate disparity levels retrieve the quantized sub-sampled SGM path costs from the memory; inverse quantize the sub-sampled SGM path costs to generate first reconstructed SGM path costs for the respective candidate disparity level; interpolate the first reconstructed SGM path costs to generate second reconstructed SGM path costs for the respective candidate disparity level; calculate aggregate SGM costs for the respective candidate disparity level based on the second reconstructed SGM path costs; and determine a disparity level for a set of stereo images based on the aggregate SGM cost.

In some examples, processor 802, memory 804, and cameras 806, 808 may form and/or be a part of an Advanced Driver Assistance System (ADAS) of automobile 800.

While the foregoing is directed to embodiments of this disclosure, other and further embodiments may be devised without departing from the basic scope thereof, and the scope thereof is determined by the claims that follow.

What is claimed is:

1. A method comprising:
  retrieving, by a processor and from a memory, path costs for an image;
  inverse quantizing, by the processor, the path costs to generate first reconstructed path costs;
  interpolating, by the processor, the first reconstructed path costs to generate second reconstructed path costs;
  determining, by the processor, an aggregate cost based on the second reconstructed path costs; and
  determining, by the processor, a disparity level for the image based on the aggregate cost.

2. The method of claim 1, wherein:
  the interpolating includes bi-linear interpolation based on a set of weights.

3. The method of claim 1, further comprising:
  summing, by the processor, the path costs corresponding to a pixel in the image.

4. The method of claim 1, wherein:
  the interpolating is based on the first reconstructed path costs and a set of weights.

5. The method of claim 1, further comprising:
  for each pixel in a region of the image, subtracting, by the processor, a cost associated with the pixel from a retrieved sub-sampled path cost associated with the pixel.

6. The method of claim 1, further comprising:
  determining, by the processor, a quantization step size;
  quantizing, by the processor, a set of path costs based on the quantization step size, to generate quantized path costs; and
  storing, by the processor in the memory, the quantized path costs,
  wherein retrieving the path costs comprises retrieving the quantized path costs.

7. The method of claim 1, wherein retrieving the path costs comprises retrieving the path costs for a first row of pixels, the method further comprising calculating path costs for a second row of pixels using the path costs for the first row of pixels, wherein the second row of pixels is adjacent to the first row of pixels.

8. An automobile comprising:
  a first camera configured to receive a first image of a stereo image;
  a second camera configured to receive a second image of the stereo image;
  a processor coupled to the first camera and to the second camera; and
  a non-transitory computer readable storage medium comprising instructions that, when executed by the processor, cause the processor to:
    retrieve path costs for the stereo image from memory;
    inverse quantize the path costs to generate first reconstructed path costs;
    interpolate the first reconstructed path costs to generate second reconstructed path costs;
    determine an aggregate cost based on the second reconstructed path costs; and
    determine a disparity level for the stereo image based on the aggregate cost.

9. The automobile of claim 8, wherein:
  interpolation of the path costs includes bi-linear interpolation based on a set of weights.

10. The automobile of claim 8, wherein the processor is configured to sum the path costs corresponding to a pixel in the stereo image.

11. The automobile of claim 8, wherein:
  interpolation of the first reconstructed path costs is based on the first reconstructed path costs and a set of weights.

12. The automobile of claim 8, further comprising:
  for each pixel in a region of the stereo image, the processor is configured to subtract a cost associated with the pixel from a retrieved sub-sampled path cost associated with the pixel.

13. The automobile of claim 8, wherein the processor is configured to:
  determine a quantization step size;
  quantize a set of path costs based on the quantization step size, to generate quantized path costs;
  store the quantized path costs to the memory; and
  retrieve the quantized path costs from the memory.

14. The automobile of claim 8,
  wherein to retrieve the path costs, the processor is configured to retrieve the path costs for a first row of pixels,
  wherein the processor is further configured to calculate path costs for a second row of pixels using the path costs for the first row of pixels, and
  wherein the second row of pixels is adjacent to the first row of pixels.

15. An apparatus comprising:
  a processor; and
  a non-transitory computer readable storage medium comprising instructions that, when executed by the processor, cause the processor to:
    retrieve path costs for a stereo image from memory;
    inverse quantize the path costs to generate first reconstructed path costs;
    interpolate the first reconstructed path costs to generate second reconstructed path costs;
    determine an aggregate cost based on the second reconstructed path costs; and
    determine a disparity level for the stereo image based on the aggregate cost.

16. The apparatus of claim 15, wherein:
  interpolation of the path costs includes bi-linear interpolation based on a set of weights.

17. The apparatus of claim 15, wherein the processor is configured to sum the path costs corresponding to a pixel in the stereo image.

18. The apparatus of claim 15, wherein:
  interpolation of the first reconstructed path costs is based on the first reconstructed path costs and a set of weights.

19. The apparatus of claim 15, wherein, for each pixel in a region of the stereo image, the processor is configured to subtract a cost associated with the pixel from a retrieved sub-sampled path cost associated with the pixel.

20. The apparatus of claim 15, wherein the processor is configured to:
  determine a quantization step size;
  quantize a set of path costs based on the quantization step size, to generate quantized path costs;
  store the quantized path costs to the memory; and
  retrieve the quantized path costs from the memory.

\* \* \* \* \*